Sept. 5, 1967            T. COOR            3,339,414
DIRECT READING RESISTANCE THERMOMETER
Filed Nov. 30, 1964            2 Sheets-Sheet 1
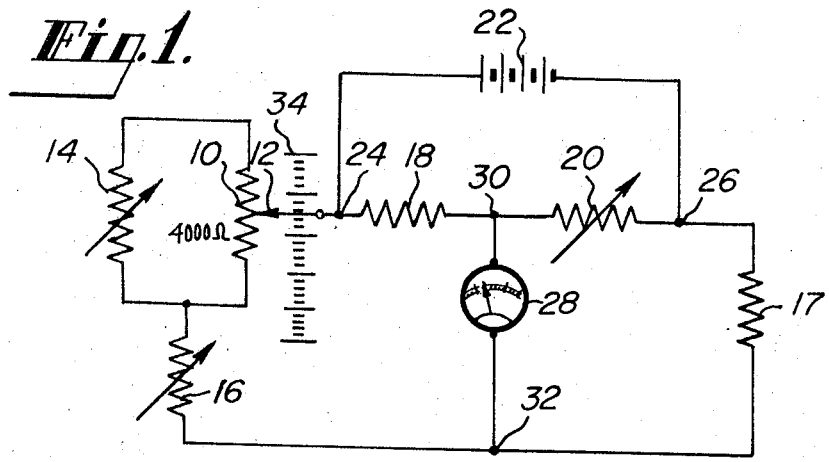
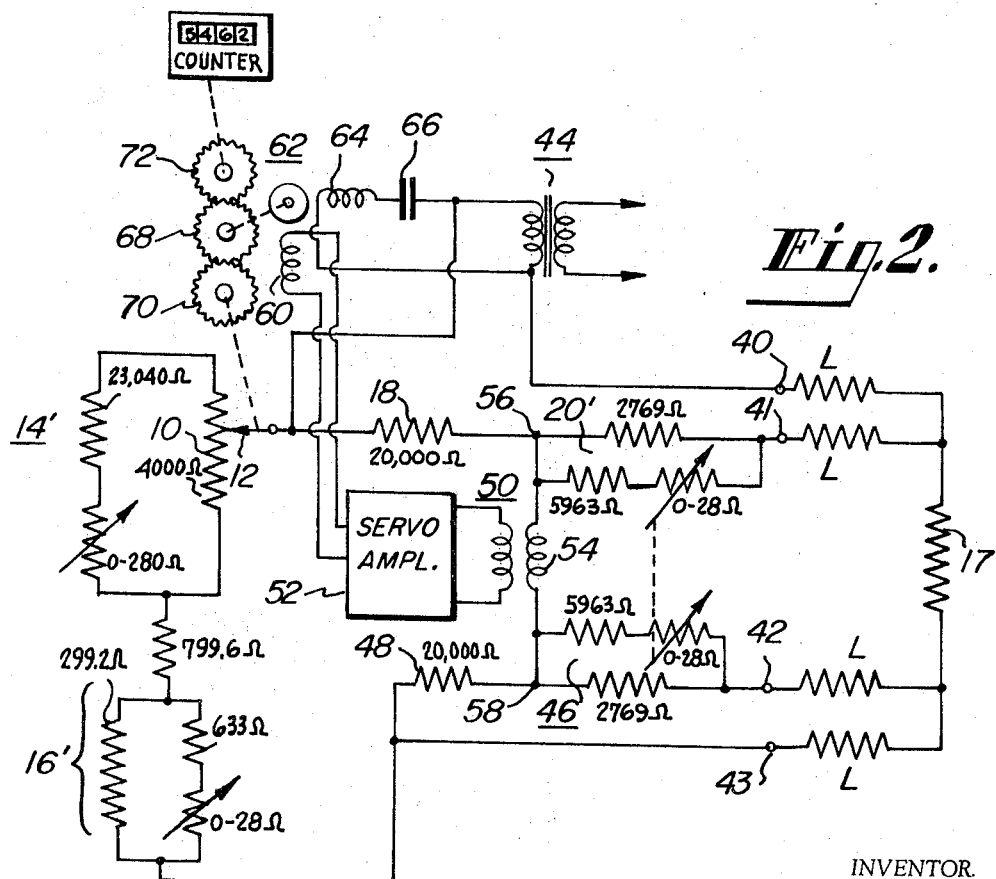
INVENTOR.
Thomas Coor

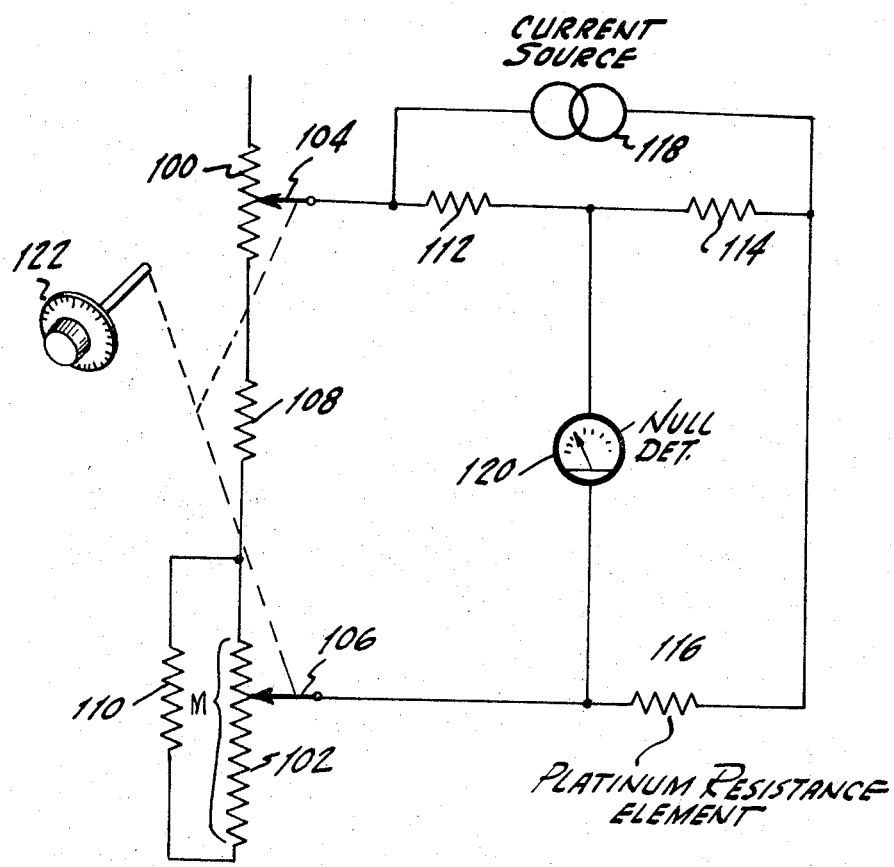

United States Patent Office 3,339,414
Patented Sept. 5, 1967

3,339,414
DIRECT READING RESISTANCE THERMOMETER
Thomas Coor, Princeton, N.J., assignor to Princeton Applied Research Corporation, a corporation of New Jersey
Filed Nov. 30, 1964, Ser. No. 416,955
4 Claims. (Cl. 73—362)

The present invention relates to an apparatus for obtaining direct readings of temperature from a resistance thermometer element, and this application is a continuation in part of an application Ser. No. 346,680 filed Feb. 24, 1964, and now abandoned, entitled, Direct Reading Resistance Thermometer.

The platinum resistance thermometer is commonly used to measure temperatures in the range from −183 to 1000° C., and is also used to define the international temperature scale between the lower temperature and 630° C. Above 0° C. and below 630° C. the temperature/resistance relationship of the platinum resistance thermometer is by definition quadratic and below 0° C. a more complex relationship is followed. The deviation from the quadratic relationship down to temperatures of −50° C. and up to 1000° C. is however very small. A good approximation of the temperature/resistance relationship of the platinum resistance thermometer in the range from −50° C. to 1000° C. is therefore a quadratic equation. The quadratic equation commonly used to represent the temperature-resistance relationship of a platinum resistance thermometer is:

$$R_T = R_0(1 + AT - BT^2)$$

where $R_0$ is the resistance of the thermometer at 0° C.,
$R_T$ is the resistance of the thermometer at the particular temperature T, and
A and B are the two parameters of the quadratic equation of the thermometer. The parameters $R_0$, A, and B vary from thermometer to thermometer. The values of A for different thermometers are in a narrow range around $A = 3.983 \cdot 10^{-3}$ and the values of B are in a narrow range around $B = 0.586 \cdot 10^{-6}$.

According to a known method of determining temperatures a platinum resistance thermometer is used, and a measurement of the resistance of the thermometer element by means of known bridge circuits is required along with a calculation using the equation representing the temperature/resistance relationship of the thermometer element. An alternative known method of determining the temperature-resistance relationship has been to prepare a complete table of temperature versus resistance readings on the thermometer, the temperature of the medium surrounding the platinum resistance thermometer then being determined by looking up in the table and interpolating if necessary.

As proposed by Dauphinee et al. in United States Letters Patent 3,087,337 entitled, Direct Reading Resistance Thermometer, issued Apr. 30, 1963, a loop circuit comprising adjustable resistances may be used to provide an electrical analogue of the resistance thermometer. If the numerical values of the parameters $R_0$, A and B are known for a particular resistance thermometer, the adjustable resistances in the loop circuit may be set to insert these values in the loop circuit. Thereafter, the total effective circuit resistance may be varied by means of a linear potentiometer. The effective resistance will vary according to the same quadratic equation as the resistance thermometer, with variations in the effective resistance due to adjustment of the linear potentiometer being analogous to the variations in the resistance of the thermometer as the temperature of the medium surrounding it changes. The linear potentiometer is calibrated in terms of the temperature of the thermometer, so that by comparing the effective resistance of the loop circuit to the resistance of the thermometer, the temperature of the latter may be ascertained directly. If it is desired to utilize another thermometer having different values of parameters $R_0$, A and B, these new values are compensated by a resetting of the adjustable resistances in the loop circuit so that the loop circuit will behave as the electrical resistance analogue of the new thermometer. Variations in the resistance of the linear potentiometer will produce changes in the effective resistance of the circuit which correspond to the quadratic resistance equation of the new thermometer.

The loop circuit provided by Dauphinee et al. is relatively difficult to design and adjust because of the interacting effects of the various resistors. For example to set up the circuit to exhibit the desired quadratic resistance characteristic, two variable resistors must be adjusted to obtain a first coefficient function, such as the A or B coefficient. The same two resistors must be adjusted at the same time while maintaining a predetermined relationship between them to establish a second coefficient function such as the other of the A and B coefficients. In addition in the Dauphinee et al. loop circuit, the third coefficient, corresponding to $R_0$ is established by a third variable resistor after the other two resistors have been properly set. The resistance value of the third resistor is established by the resistance values of first two variable resistors, thereby limiting the flexibility in the design of the temperature measuring circuit.

It is therefore an object of this invention to provide an improved direct reading resistance thermometer.

A more specific object of this invention is to provide an improved platinum resistance thermometer circuit including a plurality of adjustable resistive means which are connected to exhibit a quadratic resistance characteristic corresponding to the temperature/resistance relationship of a platinum thermometer in response to the linear adjustment of one of the resistive means; and wherein each of the other of the resistive means may be adjusted respectively to set up one of the desired coefficient functions of the quadratic relationship independently of the settings of the other resistive means.

Another object of this invention is to provide an improved platinum resistance thermometer circuit including a plurality of adjustable resistive means which are connected to exhibit a quadratic resistance characteristic corresponding to the temperature/resistance relationship of a platinum thermometer device in response to the simultaneous linear adjustment of a pair of ganged resistive means; and wherein each of the other resistive means may be adjusted respectively to set up one of the desired coefficient functions of the quadratic relationship independently of the settings of the other resistive means.

A platinum resistance thermometer circuit in accordance with the invention comprises essentially a Wheatstone bridge. A first arm of the bridge provides a linear and quadratic resistance relationship. The first arm of the bridge may comprise essentially a first adjustable resistance means in series with the parallel combination of a second adjustable resistance means and a variably tapped resistance means to provide both the linear and quadratic parts of the required resistance variation. Alternatively, the first arm may take other circuit configurations. For example it may comprise a first linear adjustable resistance means having one end terminal connected in common with both end terminals of a second linear adjustment means. In the latter embodiment, the resistance of the two arms is between adjustable contact elements on the first and second resistance means, and the adjustable contact elements are ganged for unicontrol operation.

A second arm of the bridge comprises the platinum resistance element, one of the third and fourth arms of the bridge comprises a relatively fixed resistance means and the other comprises a third adjustable resistance means.

A source of an operating potential and an output circuit are connected across opposite diagonals of the bridge. The bridge is set up so that when in balance, the ratio of the resistance value of the first arm to the resistance value of the platinum resistance element is equal to the ratio of the resistance values of the third arm of the bridge to the fourth arm of the bridge.

As will be explained hereinafter, the first, second and third adjustable resistance means are set to establish the coefficient A, B and $R_O$, respectively, in a quadratic resistance relationship closely approximating the temperature/resistance relationship of a platinum thermometer. Each of the adjustable resistance means is set independently of and without affecting the settings of other adjustable resistance means.

The novel features which are characteristic of this invention are set forth in the appended claims. The invention itself however, both as to its organization and method of operation, together with additional objects and advantages thereof, will best be understood from the following description when read in connection with the accompanying drawings, in which:

FIGURE 1 is a simplified schematic circuit diagram of a platinum resistance thermometer embodying the invention; and FIGURE 2 is a more detailed schematic circuit diagram of a platinum resistance thermometer embodying the invention.

FIGURE 3 shows a modification.

Referring to FIGURE 1, the resistance thermometer circuit is shown to comprise a Wheatstone bridge having a first arm comprising a linear resistor 10 with an adjustable contact 12. A first adjustable resistor 14 is connected in parallel with the resistor 10, and a second adjustable resistor 16 in series with the parallel combination completes the first arm of the bridge.

A second arm of the bridge includes a platinum resistance thermometer 17 having a resistance characteristic $$R_{17}=R_O(1+AT-BT^2) \quad (1)$$

The third arm of the bridge comprises a relatively fixed resistor 18 and the fourth arm comprises a variable resistor 20. It is to be understood that the relatively fixed and variable resistors 18 and 20 may be interchanged by making appropriate changes in resistance values.

An operating potential supply, shown as a battery 22 is connected across one diagonal 24-26 of the bridge, an output circuit, shown as a meter 28, is connected across the other diagonal 30-32 of the bridge. By adjusting the tap 12, the bridge can be brought into balance as indicated by minimum reading of the meter 28, and the setting of the tap 12 on resistor 10 provides a linear indication of temperature on a scale 34.

The resistance value of the first arm of the bridge comprises the resistance of resistor 16 plus the parallel combination of (1) that portion of resistor 10 below the tap 12 and (2) the resistor 14 in series with that portion of resistor 10 above the tap 12. The resistor 10 is selected to provide a constant, C, equal to a given number of ohms per degree centigrade. Thus the resistance of the resistor 10 is equal to CZ, where Z equals the maximum number of degrees centigrade to be measured. The resistance between the point 39, the end of the resistor 10, and the tap 12 on the resistor 10, will be CX, where X is the number of degrees centigrade to be indicated on the scale 34. Expressed mathematically, the resistance of the first arm of the bridge is $$R_1=R_{16}+\frac{cx(R_{14}+R_{10}-cx)}{cx+R_{14}+R_{10}-cx}$$

simplifying:

$$R_1=R_{16}+cx-\frac{c^2}{R_{14}+R_{10}}x^2 \quad (2)$$

This quadratic relationship corresponds in form to the quadratic resistance-temperature relationship of the platinum sensor.

At balance of the bridge:

$$R_1=\frac{R_{18}}{R_{20}}R_{17}$$

Substituting Equations 1 and 2 into Equation 3:

$$R_{16}+cx-\frac{c^2}{R_{14}+R_{10}}x^2=\frac{R_{18}R_O(1+AT-BT^2)}{R_{20}}$$

By multiplying the left side of the equation by $c/c$, and the right side by $A/A$:

$$c\left(\frac{R_{16}}{c}+x-\frac{c}{R_{14}+R_{10}}x^2\right)=\frac{R_{18}}{R_{20}}AR_O\left(\frac{1}{A}+T-\frac{B}{A}T^2\right) \quad (4)$$

If the following conditions are made:

$$c=\frac{R_{18}}{R_{20}}AR_o \quad (5)$$

$$\frac{R_{16}}{c}=\frac{1}{A} \quad (6)$$

$$\frac{c}{R_{14}+R_{10}}=\frac{B}{A} \quad (7)$$

Then $x=T$

This may be done by making $R_{18}$ equal to some fixed value $$R_{20}=\frac{R_{18}}{c}AR_o \quad \text{(from Eq. 5)} \quad (8)$$

$$R_{16}=c\frac{1}{A} \quad \text{(from Eq. 6)} \quad (9)$$

$$R_{14}+R_{10}=c\frac{A}{B} \quad \text{(from Eq. 7)} \quad (10)$$

Under the foregoing conditions the scale divisions $x$ on the linear resistor 10 will be the temperature of the platinum sensor ($R_T$), and these scale divisions will be equally spaced along the linear resistor 10 for equal changes in temperature.

In practice, the range of A will be from $3.978\times10^{-3}$ to $3.988\times10^{-3}$ and the range of B will be from $5.84\times10^{-7}$ to $5.88\times10^{-7}$.

Where it is desired to measure temperatures in the range of 0° C. to 1000° C. the resistor 10 may be made equal to 4000 ohms as is indicated. There are 4 ohms per degree C., and hence the constant $c$ in the foregoing equations will be equal to 4. The quantity $R_O$ may be determined conveniently by immersing the sensor 17 into water at the freezing point (0° C.), and measuring the resistance thereof. This determines the setting of the resistor 20 in accordance with Equation 9. The values of A and B of the sensor 17 are known, or may be determined in a known manner.

Another form of the resistance thermometer circuit is shown in FIGURE 2. The circuit of FIGURE 2 differs from that of FIGURE 1 in that: (1) the variable resistors 14, 16 and 20 of FIGURE 1 are replaced by an equivalent, but more convenient resistance networks; (2) the meter 28 is replaced by a servo amplifier system for automatically adjusting the tap on the resistor 12, and in addition drives a separate indicator device; and (3) additional circuit means are provided for balancing out the effects of the lead resistance of the platinum temperature sensor 17.

The operation of the circuit is similar to that described above in connection with FIGURE 1 with respect to the basic elements of the bridges 10, 14', 16', 17, 18 and 20'.

The platinum temperature sensor is provided with two parallel conductors from each end thereof to the terminals 40, 41, 42 and 43. If desired, a plurality of temperature sensors at different locations may be selectively connected to the apparatus by providing suitable switching means, not shown, at the terminals 40–43. The resistances of the connections to the sensor are indicated by the resistors L, which are of equal value.

The effect of the lead resistances L is eliminated by utilizing a Kelvin double bridge network. To this end, the terminal 41 is connected to the resistance network 20', and the terminal 43 is connected to the resistance network 16'. A source of alternating voltage from the power means is coupled by way of the transformer 44 between the terminal 40 and the tap 12 on resistor 10. A resistor network 46 and a relatively fixed resistor 48 are connected in series between the terminal 42 and the resistor network 16'. It will be noted that the resistor 48 is of the same value as the resistor 16, and that the networks 20' and 46 are identical. In addition, like variable resistors in the networks 20' and 46 are ganged for unicontrol operation in tracking relation.

An input transformer 50 for a servo amplifier 52 includes a primary winding 54 connected across one diagonal 56, 58 of the Kelvin bridge. The servo amplifier drives one winding 60 of a servo motor 62, a second winding 64 thereof being coupled through a capacitor 66 to the A-C mains. The servo motor 62 is coupled through gears 68 and 70 to drive the tap 12 on the resistor 10 in a direction to bring the bridge into balance. The gear 68 also drives a gear 72 which is coupled to a counter type indicator. As shown, the temperature is accurately indicated to a tenth of a degree centigrade.

It is to be understood that the apparatus is adjusted for operation in the same manner as described in connection with FIGURE 1. The specific embodiments of the invention described herein may be modified without departing from the scope of the invention. For example, any suitable indicating means may be provided in addition to those described. For example, electronic tubes capable of indicating Arabic or other type numerals may be used. In addition, the resistor 10 may comprise a digital potentiometric network including a plurality of individual fixed resistors, with suitable switching means to select a desired tap point.

It should be noted that any resistive material having a stable temperature-resistance relationship of the form $R(T) = R_0(1 + AT - BT^2)$ may be used as sensor.

It is further noted that the thermometer may be calibrated to indicate temperature on the Fahrenheit scale.

In the embodiment of the invention shown in FIGURE 1 adjustment of the tap 12 on the resistor 10 provided both the linear and quadratic parts of the resistance variation required to match the resistance vs. temperature curve of the resistance thermometer 17.

The linearly varying part of the resistance variation may be separated from the quadratically varying part by using two linear potentiometers as shown in FIGURE 3. The linear potentiometers 100 and 102 have adjustable taps 104 and 106 respectively which are ganged for unicontrol operation as indicated by the dashed lines. The potentiometer 100 is connected through a resistor 108 to the potentiometer 102. As indicated, a resistor 110 is connected in parallel with the potentiometer 102 and is equal in resistance value to the total resistance value of the potentiometer 102.

The remainder of the bridge circuit including resistors 112 and 114 and the resistance thermometer element 116 is connected in the same manner as shown in FIGURE 1. A current source 118 is connected across one diagonal of the bridge and a meter 120 across the other diagonal of the bridge.

The resistance value of the first portion of the bridge comprises three parts in series. First, the resistance from the tap 104 to the resistor 108. Second the resistor 108, and third the combination of the portion of the potentiometer 102 from the resistor 108 to the tap 106 in parallel with the resistor 110 and the remainder of the potentiometer 102.

The potentiometer 100 is selected to provide a constant, G, equal to a given number of ohms per degree centigrade. Thus the resistance of the potentiometer 10 is equal to GZ, when Z equals the maximum number of degrees centigrade to be measured. In like manner the potentiometer 102 is selected to provide a constant, D, equal to a given number of ohms per degree centigrade. The total resistance of the potentiometer 102 is equal to DZ. Where X is the number of degrees centigrade indicated on the scale 122 the total resistance between the tap 104 and the resistor 108 is GX and, disregarding the resistor 110, the resistance between the tap 106 and the resistor 108 is DX. Expressed mathematically, the resistance of the first arm of the bridge is:

$$R_1 = GX + R_{108} + \frac{(M-DX)(M+DX)}{2M}$$

where $M = R_{110}$ = potentiometer 102 simplifying:

$$R_1 = GX + R_{108} + \frac{M}{2} - \frac{D^2X^2}{2M} \quad (A)$$

As was the case for the circuit of FIGURE 1, this quadratic relationship corresponds in turn to the quadratic re-resistance-temperature relationship of the platinum sensor.

At balance of the bridge:

$$R_1 = \frac{R_{112}}{R_{114}} R_{116} \quad (B)$$

Substituting Equation 1 and A into Equation B;

$$GX + R_{108} + \frac{M}{2} - \frac{D^2X^2}{2M} = \frac{R_{112}}{R_{114}} R_0(1 + AT - BT^2)$$

By multiplying the left side of the equation by $G/G$ and the right side by $A/A$:

$$G\left[\frac{Z}{G} + \frac{M}{2G} + X - \frac{D^2X^2}{2GM}\right] = \frac{R_{112}}{R_{114}} AR_0 \left[\frac{1}{A} + T - \frac{B}{A}T^2\right]$$

Making the coefficients on the left side of the equation equal to the corresponding coefficients on the right side of the equation:

$$G = \frac{R_{112}}{R_{114}} AR_0 \qquad R_{114} = \frac{R_{112}}{G} AR_0$$

$$\frac{Z}{G} + \frac{M}{2G} = \frac{1}{A} \qquad Z = \frac{G}{A} - \frac{M}{2}$$

$$\frac{D^2}{2GM} = \frac{B}{A} \qquad M = \frac{AD^2}{B2G}$$

and $X = T$

Under the forgoing conditions the scale divisions X on the linear potentiometers 110 and 102 will be the temperature of the platinum sensor, and these scale divisions will be equally spaced for equal changes in temperature. The values of the resistor 112, G and D are arbitrary, and are chosen to give a practical working device. In accordance with one embodiment of the invention the constants may be:

$G = 4$
$D = 1$
$R_{110} = 20,000$

If this bridge is used with a platinum resistance thermometer having nominal characteristics for A, B and $R_0$, such that $$\frac{1}{A} = 251, \quad \frac{A}{B} = 6800$$

and $R_0 = 100$, then $M = 850$, $Q = 1923$ and $Z = 579$.

A circuit constructed as described permits the temperature at the resistance element 116 to be determined by the setting of bridge by the ganged potentiometers 100 and 102 to a balanced condition, and the temperature is indicated by the calibrated scale 122.

What is claimed is:
1. A temperature measuring system of the type including a resistance thermometer sensor having a linear and a quadratic temperature vs. resistance characteristic,
   means connecting said sensor in a bridge circuit including as one leg thereof, a resistance network exhibiting a quadratic resistance-linear adjustment characteristic,
   said resistance network including first and second linear resistors connected in series, both of said first and second resistors having adjustable taps and, the resistance between the taps of said first and second resistors comprising one of the legs of said bridge circuit,
   further resistance means connected in parallel with said second resistor, the taps of said linear resistors being ganged for unicontrol operation and adjustable to balance said bridge circuit.
2. A temperature measuring system of the type including a resistance thermometer sensor having a linear and a quadratic temperature vs. resistance characteristic,
   a bridge circuit including a pair of diagonals,
   means connecting a source of operating potential across one of said diagonals,
   utilization means connected across the other of said diagonals,
   said bridge circuit including a first fixed resistor and said resistance thermometer connected in series across said utilization means,
   said bridge circuit further including a second fixed resistor and a resistance network connected in series across said utilization means.
   said resistance network including first and second linear resistors connected in series, both of said first and second resistors having adjustable taps,
   a further resistance means connected in parallel with said second linear resistor, the taps of said linear resistors being ganged for unicontrol operation and adjustable to balance said bridge circuit.
3. A temperature measuring system as defined in claim 2 including a third fixed resistor connected in series between said first and second resistors.
4. A temperature measuring circuit including a platinum temperature sensor whose resistance varies with temperature in accordance with the relationship

$$R_T = R_0(1 + AT - BT^2)$$

where $R_T$ is the resistance of the platium temperature sensor at a given temperature T, $R_0$ is the resistance of the platinum temperature sensor at zero degrees centigrade, and A and B are known parameters of the temperature sensor,
   a first resistive circuit means $R_1$ having a tap, and a value C corresponding to the number of ohms between positions of said tap corresponding to changes in one degree centigrade.
   second resistive circuit means $R_2$ of arbitrary resistance value connected to said tap,
   third resistive circuit means $R_3$ having a resistance value equal to $R_2/C\ AR_0$, said third resistive circuit means connected between said second resistive circuit means and a first terminal of said platinum temperature sensor,
   fourth resistive circuit means $R_4$ having a tap, and a value D corresponding to the number of ohms between positions on said tap corresponding to changes of one degree centigrade, said fourth resistive circuit means having a value equal to $$\frac{A}{B}\frac{D^2}{2C}$$

said tap of $R_4$ connected to a second terminal of said platinum temperature sensor,
   fifth resistive circuit means equal in value to $R_4$, and connected across $R_4$,
   sixth resistive circuit means $R_5$ connected in series between said first and fourth resistive circuit means and having a value equal to $$\frac{C}{A} - \frac{R_4}{2}$$

a source of operating potential connected between the tap of said first resistive circuit means and the junction of said third resistive circuit means with said platinum sensor, and
   utilization means connected from the junction of said second and third resistive circuit means to the tap of said fourth resistive circuit means.

References Cited
UNITED STATES PATENTS 3,087,337    4/1963    Dauphinee et al. _____ 73—362
3,117,448    1/1964    Gilmont et al. _____ 73—362

DAVID SCHONBERG, *Primary Examiner.*

LOUIS R. PRINCE, *Examiner.*

F. SHOON, S. BAZERMAN, *Assistant Examiners.*

CERTIFICATE OF CORRECTION

Patent No. 3,339,414            September 5, 1967

Thomas Coor

It is hereby certified that error appears in the above numbered patent requiring correction and that the said Letters Patent should read as corrected below.

In the drawings, Sheet 1, Fig. 1, the numeral "39" should appear at the junction of resistors 10, 14 and 16; column 1, line 28, for "temperature-resistance" read -- temperature/resistance --; column 2, line 5, for "directly," read -- directly. --; column 3, line 55, before "an" insert -- and --; column 6, line 10, for "10" read -- 100 --; line 20, for "DX" read -- M-DX --; lines 43 and 44 and lines 51 and 52, for $\frac{Z}{G}$, each occurrence, read $\frac{R_{108}}{G}$ lines 51 and 52, for "Z=" read -- $R_{108}=$ --; line 58, for "110" read -- 100 --; line 68, for "$R_{110}$" read -- $R_{112}$ --; same column 6, line 75, for "1923" read -- 1992, wherein Q equals $R_{114}$, --; same line 75, for "Z" read -- $R_{108}$ --; column 8, lines 22 to 24, after the equation insert a comma; lines 32 to 34, after the equation insert a comma.

Signed and sealed this 3rd day of December 1968.

(SEAL)
Attest:

EDWARD M. FLETCHER, JR.
Attesting Officer

EDWARD J. BRENNER
Commissioner of Patents